Feb. 6, 1968　　　R. J. LYTLE ETAL　　　3,367,010
JIG FOR ASSEMBLING ROOF TRUSSES
Filed Sept. 27, 1965　　　　　　　　　　　　　2 Sheets-Sheet 1
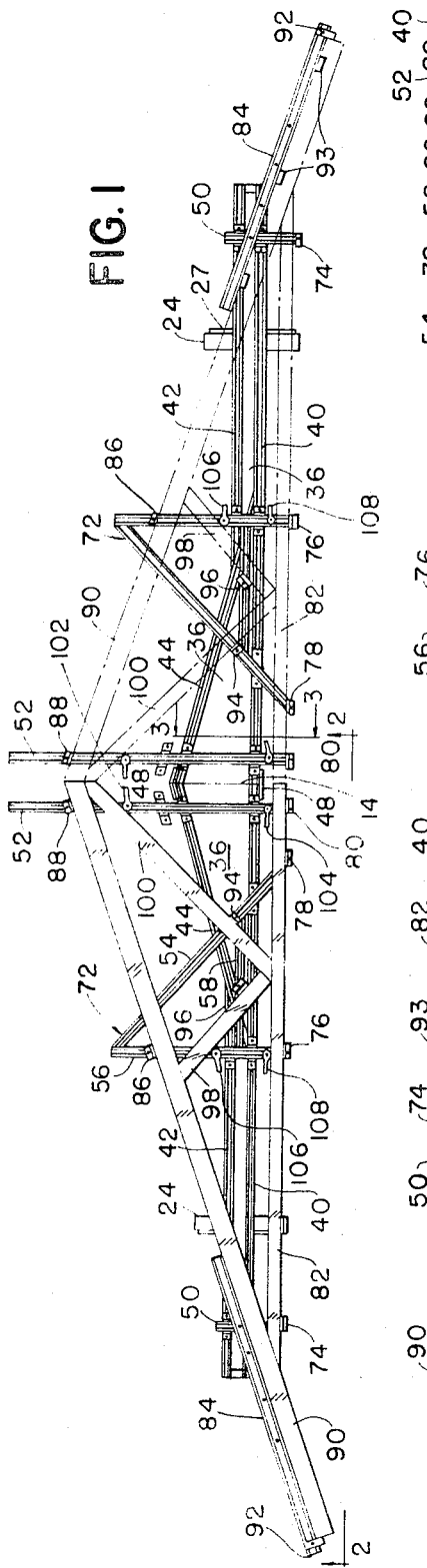
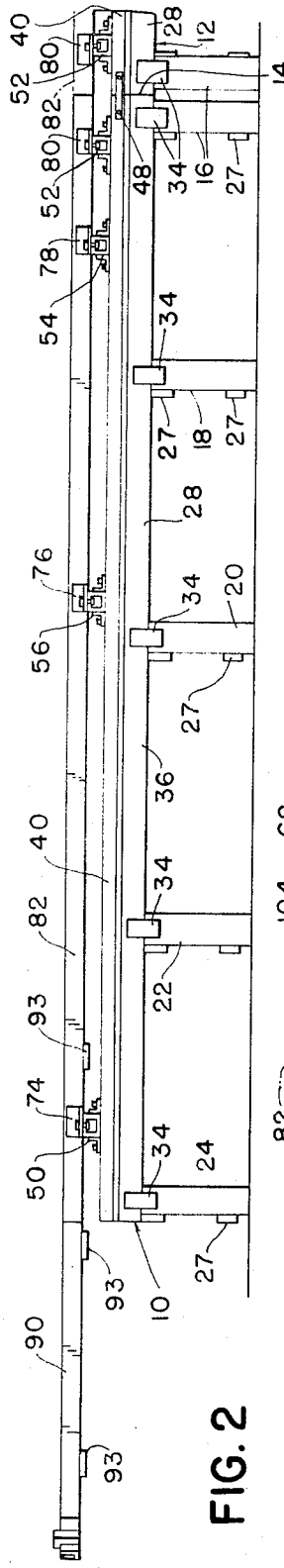
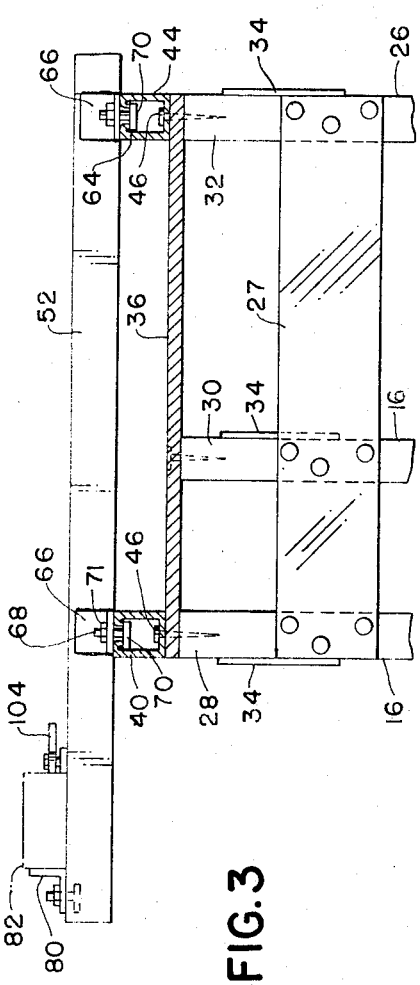
INVENTOR.S
ROBERT J. LYTLE
ROBERT T. GIRVIN
*Whittemore, Hulbert & Belknap*
ATTORNEYS Feb. 6, 1968  R. J. LYTLE ET AL  3,367,010
JIG FOR ASSEMBLING ROOF TRUSSES
Filed Sept. 27, 1965  2 Sheets-Sheet 2
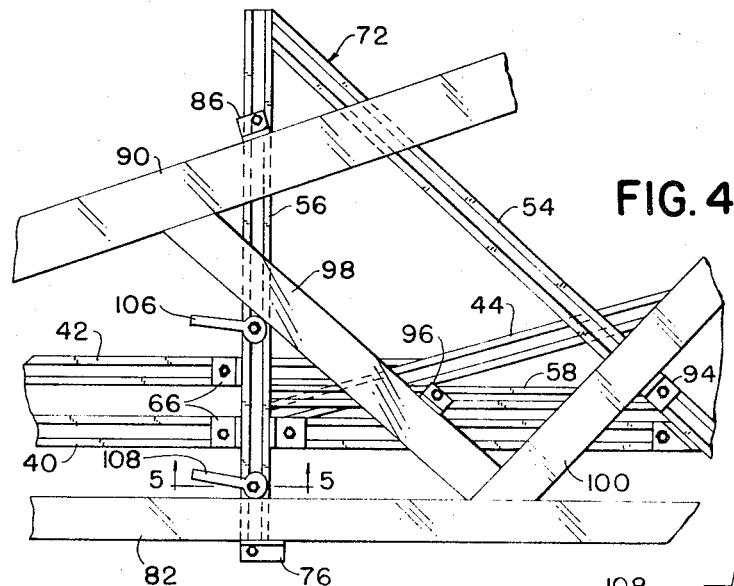
FIG. 4
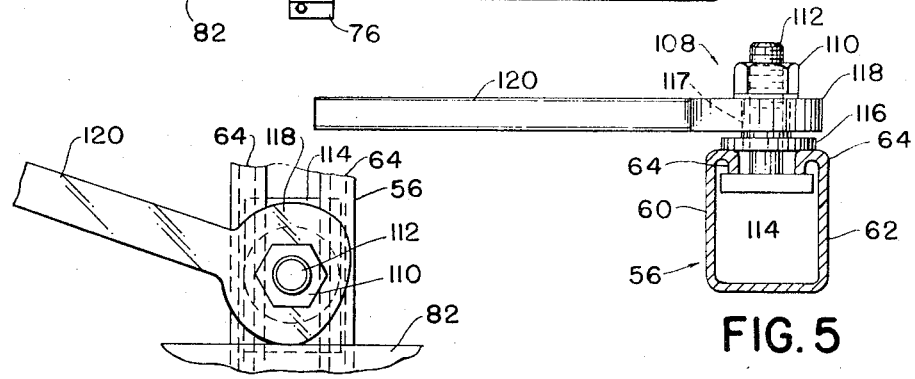
FIG. 5
FIG. 6
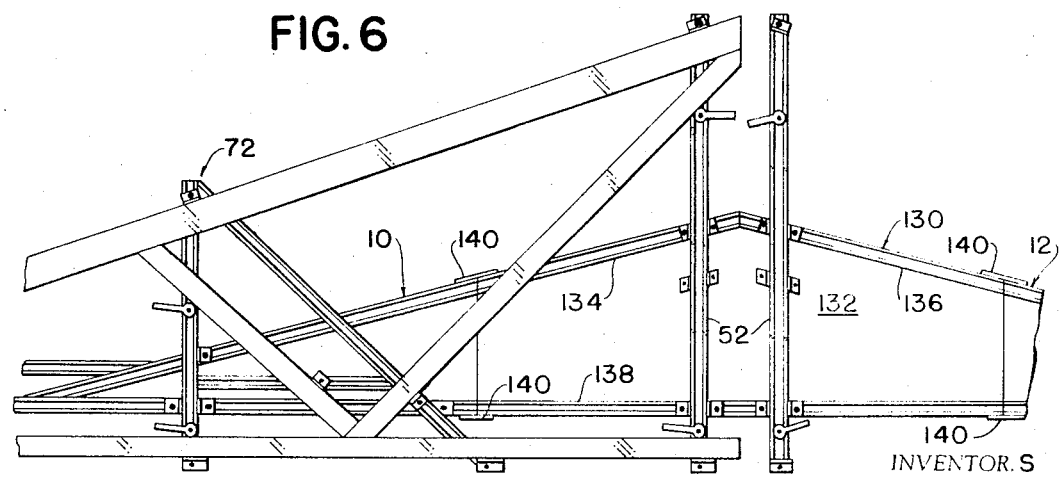
FIG. 7
INVENTOR.S
ROBERT J. LYTLE
BY ROBERT T. GIRVIN
Whittemore, Hulbert & Belknap
ATTORNEYS

United States Patent Office 3,367,010
Patented Feb. 6, 1968

3,367,010
JIG FOR ASSEMBLING ROOF TRUSSES
Robert J. Lytle, Birmingham, and Robert T. Girvin, Southfield, Mich., assignors to The Panel-Clip Company, Farmington, Mich., a corporation of Michigan
Filed Sept. 27, 1965, Ser. No. 490,610
6 Claims. (Cl. 29—200)

ABSTRACT OF THE DISCLOSURE

A jig for positioning and holding truss members during assembly of a roof truss comprising a series of rails mounted on a support table and on which the truss members are placed, some of the rails being adjustable relative to others and carrying adjustable stops and cam means to locate the truss members in a desired pattern and clamp the truss members together prior to the application of gusset plates to permanently join the truss members. A removable table section, also carrying a series of rails, permits expansion of the jig to accommodate larger trusses.

---

According to the invention the precut truss members are placed in the jig in a prescribed order and are then clamped in the jig so they are braced against each other and against the jig so as to form a tight truss. When the truss members are assembled and are held in the jig, the joints between the truss members are exposed and free of the jig to facilitate setting of gusset plates. The jig is readily adjustable so that it can be used to aid in the assembly of roof trusses of different sizes and geometries. It is also adjustable to accommodate truss members of different cross sectional sizes.

The jig is simple and inexpensive to manufacture. It is easily used, and reduces the cost of manufacture of roof trusses due to the ease and rapidity with which the truss members are inserted and braced together so as to form a truss. The ready adjustability of the jig eliminates the need for a separate jig for each size or type of truss which is to be made.

Accordingly, a principal object of the invention is to provide a new and improved jig for use in assembling roof trusses.

Another object is to provide an adjustable jig useful in assembling different sizes and types of roof trusses.

A further object is to provide a jig for use in assembling roof trusses wherein the truss members are positively braced against each other and the jig to form tight joints therebetween, and which facilitates the joining of the members by gusset plates or other fastening means.

Other and further objects of the invention will be apparent from the following description and claims and may be understood by reference to the accompanying drawings, of which there are two sheets, which by way of illustration show a preferred embodiment of the invention and what we now consider to be the best mode of applying the principles thereof. Other embodiments of the invention may be used without departing from the scope of the present invention as set forth in the appended claims.

In the drawings:

FIGURE 1 is a plan view of a jig according to the invention;

FIGURE 2 is an enlarged side elevational view taken along line 2—2 of FIGURE 1;

FIGURE 3 is an enlarged vertical sectional view taken along line 3—3 of FIGURE 1;

FIGURE 4 is an enlarged plan view of a portion of the jig;

FIGURE 5 is a sectional view taken along line 5—5 of FIGURE 4;

FIGURE 6 is a plan view of the structure shown in FIGURE 5; and

FIGURE 7 is a partial plan view of a jig according to the invention with an insert added thereto.

As shown in the drawings, the jig comprises two support tables 10 and 12 which are normally joined together at joint 14. Each table is provided with a plurality of paired legs 16, 18, 20, 22, 24 and 26. The legs are secured together by means of side braces 27 and support cross rails 28, 30 and 32 which are secured to the legs by means of gusset plates 34. A plywood panel 36 is secured to the cross rails 28, 30 and 32 so as to form a top for each table 10 and 12. Metal frame rails 40, 42 and 44 are secured to the tops of tables 10 and 12 by means of bolts 46. These rails are located along the upper and lower edges of the tables 10 and 12, as shown in FIGURE 1. The tables are normally held together by means of metal straps 48 which are secured to the abutting ends of the frame rails 40 and 44 on each table.

Each table carries a number of mounting rails 50, 52, 54, 56 and 58 adjustable secured to the frame rails 40, 42 and 44 which form a support grid therefore. The frame and mounting rails are preferably both made of metal stock having a U-shaped cross section with the ends of the side walls 60 and 62 bent inwardly and downwardly as at 64 to provide upwardly open slots or channels. The frame rails 40, 42 and 44 are secured to the tables 10 and 12 and the mounting rails 50, 52, 54, 56 and 58 rest upon the top of the frame rail grid as shown in FIGURE 3 and carry a number of L-shaped brackets 66 welded to the side walls thereof. Bolts 68 extend through the brackets 66 and the heads 70 of the bolts 68 engage beneath the end flanges 64 of the frame rails. Nuts 71 are threaded onto the bolts 68 so as to secure the mounting rails to the frame rails.

Mounting rails 50 are located on the remote end of each table 10 and 12 and serve to support the outer portions of the roof truss. Mounting rails 52 are secured to the tables 10 and 12 adjacent the intersection 14 therebetween and serve to support the middle portion of the roof truss. Mounting rails 54, 56 and 58 are secured together to form an A-shaped subassembly 72 which supports the portions of the roof truss between the mounting rails 50 and 52. As described, the support surfaces of the mounting rails define a planar support surface on which the truss members rest during assembly of the truss.

Truss stops 74, 76, 78 and 80 are secured to mounting rails 50, 56, 54 and 52 respectively and are aligned along the lower ends thereof as shown in FIGURE 1 so as to locate truss member 82 within the jig. Truss stops 84, 86 and 88 are secured at an adjusted position along mounting rails 50, 56 and 52 adjacent the upper ends thereof, as seen in FIGURE 1, and serve to locate truss member 90 in the jig. Truss stop 84 is an elongated section of a channel rail similar to the frame and mounting rails and carries an end stop 92 at the remote end thereof that serves to locate the outer end of the truss member 90. Truss stop 84 is also provided with a number of support flanges 93 which cooperate with the mounting rail 50 in supporting truss member 90. Truss stops 94 and 96 are carried by mounting rails 54 and 58 respectively and serve to locate interior truss members 98 and 100. Each stop member is secured to its respective mounting rail by means of a bolt and nut connection like that shown in FIGURE 3.

A number of adjustable stops 102, 104, 106 and 108 are used to hold the truss members against the previously mentioned stops. Each adjustable stop is secured to its respective mounting rail by means of a bolt and nut connection as shown in FIGURE 5. Nut 110 is threadedly engaged on bolt 112 which carries a head 114 engageable with flanges 64 of the mounting rail so that tightening of the nut 110 secures flanges 64 between bolt head 114 and a plate 116 which abuts the lower end of a bushing 117 so as to locate the adjustable stop on the mounting rail. A cam 118 is journaled on bushing 117 and includes a handle portion 120. The adjustable stops 102, 104, 106 and 108 are positioned against their respective truss members so that when the handle 120 is rotated, the cam 118 engages the truss member and clamps it against one of the truss stops previously described. The truss stops and the adjustable stops may be positioned in different places on the mounting rails so that the jig is easily adjustable for use in assembling different sizes and geometries of roof trusses.

In FIGURES 1–4 of the drawings the truss stops and adjustable stops are arranged so that the jig is useful for holding truss members during the assembly of a Fink or W type roof truss. In the assembly of this type truss the exterior truss members 82 and 90 are placed into the jig before the interior truss members 98 and 100 are added. Truss members 90 are first positioned within the jig as shown and are located against truss stops 84, 86 and 88. End stops 92 are employed to hold the abutting ends of truss members 90 firmly against each other. Horizontal truss members 82 are then positioned within the jig and are located by truss stops 74, 76, 78 and 80 so that the outer ends thereof abut truss members 90. An adjustable stops 104 and 108 are then tightened so as to positively secure the truss members 82 against the truss stops 74, 76, 78 and 80. Interior truss members 100 are then inserted in the jig and positioned against truss stops 94 and the exterior truss members 82 and 90. Truss member 98 is then positioned as shown between truss members 90 and 100 and against truss stop 96. Adjustable stops 102 are tightened so as to tightly clamp truss members 100 against truss member 90. Adjsutable stops 106 are then tightened so as to clamp interior truss members 98 against truss members 90 and truss stops 96 whereby the truss members 98 are wedged between truss members 90 and 100. The truss is now completely assembled within the jig and is ready for the application of gusset plates thereto at the joints between the respective truss members. It should be noted that the jig is so constructed that all of the joint areas are free of the jig, thereby facilitating application of gusset plates at these joints on both sides of the truss. After the truss has been secured together by means of gusset plates, the various stops are loosened and the completed truss may be freely lifted from the jig.

As shown in FIGURE 7, the jig is provided with an insert portion 130 which may be positioned between the tables 10 and 12 so as to expand the jig and enable it to be used to assist in the assembly of relatively large roof trusses. The insert 130 includes a table portion 132 to which are secured frame rails 134, 136 and 138 which serve as extensions of the frame rails carried by tables 10 and 12. The insert is secured to the tables 10 and 12 by means of straps 140 secured to the abutting ends of the table frame rails and the insert frame rails. When the insert 130 is used, the mounting rail subassemblies 72 are positioned on the table frame rails more nearly adjacent the ends of table sections 10 and 12 than when the jig is used as shown in FIGURE 1, and the mounting rails 52 are relocated to a position on either side of the center of the insert. The adjustable stops and truss stops are also positioned so that they properly locate the truss members used in the assembly of the large truss.

In FIGURE 7 the insert 130 is used to expand the jig so that it can be used to assemble a large W or Fink type truss similar to the truss shown in FIGURE 1. In this case the steps of assembling the truss are the same as those described above. While the drawings disclose the use of the jig during the assembling of one type of truss, the support rail subassemblies 72, truss stops, and adjustable stops are readily relocatable so that the jig can be easily adapted to aid in the construction of various types of roof trusses. The stops 84, 86 and 88 may also be positioned to form trusses of different pitch.

While we have illustrated and described a preferred embodiment of our invention, it is understood that this is capable of modification, and we therefore do not wish to be limited to the precise details set forth but desire to avail ourselves of such changes and alterations as fall within the purview of the following claims.

What we claim as our invention is:

1. A jig for locating and holding truss members during assembly of a roof truss comprising a support table, mounting rails secured to said table for supporting the end portions of exterior truss members, a series of mounting rails secured together to form a subassembly which is movably mounted on said table to a desired position between said first-mentioned mounting rails and adapted to support intermediate portions of said exterior truss members and interior truss members, adjustable stops on said mounting rails adapted to be secured thereto at selected points along the length of said rails and projecting upwardly above said rails to define locating means for said truss members and to hold said truss members in the desired relationship, said subassembly having a stop and a cam means adjustably mounted thereon and engageable with opposite sides of one of said interior truss members at axially spaced points along said one member, said cam means being operable upon actuation thereof to force said one truss member against adjacent truss members and thereby force the latter truss members against their respective stops.

2. A jig for locating and holding truss members during assembly of a roof truss comprising a support table, a series of mounting rails secured together to form a subassembly movably mounted on said table for supporting the truss members, adjustable stops on said mounting rails adapted to be secured thereto at selected points along the length of said rails and projecting upwardly above said rails to define locating means for said truss members and to hold said truss members in the desired relationship, cam means adjustably mounted on said rails and engageable with certain of said truss members, said cam means being operable upon actuation thereof to force the truss members engaged thereby against adjacent truss members and thereby force the latter truss members against their respective stops.

3. A jig for locating and holding truss members during assembly of a roof truss comprising a support table, a series of frame rails secured to said support table, a series of mounting rails secured together to form a subassembly extending across said frame rails and adjustably secured to said frame rails at selected points along their lengths and forming a planar truss supporting surface, adjustable stops on said mounting rails adapted to be secured thereto at selected points along the length of said mounting rails and projecting upwardly thereabove to define locating means for said truss members, cam means adjustably mounted on said mounting rails and engageable with certain of said truss members, said cam means being operable upon actuation thereof to force the truss members engaged thereby against adjacent truss members and thereby force the latter truss members against their respective stops.

4. A jig according to claim 3 wherein said support table comprises two similar table sections each having similar frame rails thereon and adapted to be detachably secured together in end to end relation, and a removable table insert section adapted to be interposed between and detachably secured to said two table sections, said insert section having frame rails thereon adapted to align with and form extensions of the frame rails on said two table sections and additional mounting rails adjustably secured to the frame rails on said insert section to cooperate with said first-mentioned mounting rails in locating and holding the truss members.

5. A jig for locating and holding truss members during assembly of a roof truss comprising a support table, a series of frame rails secured to said support table, a series of mounting rails secured together to form a sub-assembly extending across and adjustably secured to said frame rails at selected points thereon and forming a surface for supporting truss members, adjustable stops on said mounting rails adapted to be secured thereto at selected points along the length of said mounting rails and projecting upwardly thereabove to define locating means for said truss members, and cam means adjustably mounted on one of said mounting rails and engageable with one of said truss members, said cam means being operable upon actuation thereof to force said one truss member against adjacent truss members and thereby force the latter truss members against their respective stops.

6. A jig according to claim 5 wherein said cam means engages said one truss member at a point axially spaced from and on the opposite side of the point of engagement of one of said stops with said one truss member thereby to tend to rotate said one member about said one stop and to wedge said one member between a pair of truss members which extend generally crosswise of said one member.

References Cited

UNITED STATES PATENTS

| | | | |
|---|---|---|---|
| 2,342,179 | 2/1944 | Ciesa et al. | 29—200 |
| 3,235,156 | 2/1966 | Jones et al. | 227—153 |

THOMAS H. EAGER, *Primary Examiner.*